Jan. 13, 1925.

C. A. WITTER 1,522,662

VEHICLE WHEEL

Filed Feb. 16, 1923   3 Sheets-Sheet 1

Witnesses
George A. Gruss.
Evelyn Crompton

Inventor
Claude A. Witter
By Joshua R. H. Potts
His Attorney

Jan. 13, 1925.                                              1,522,662
C. A. WITTER
VEHICLE WHEEL
Filed Feb. 16, 1923        3 Sheets-Sheet 2
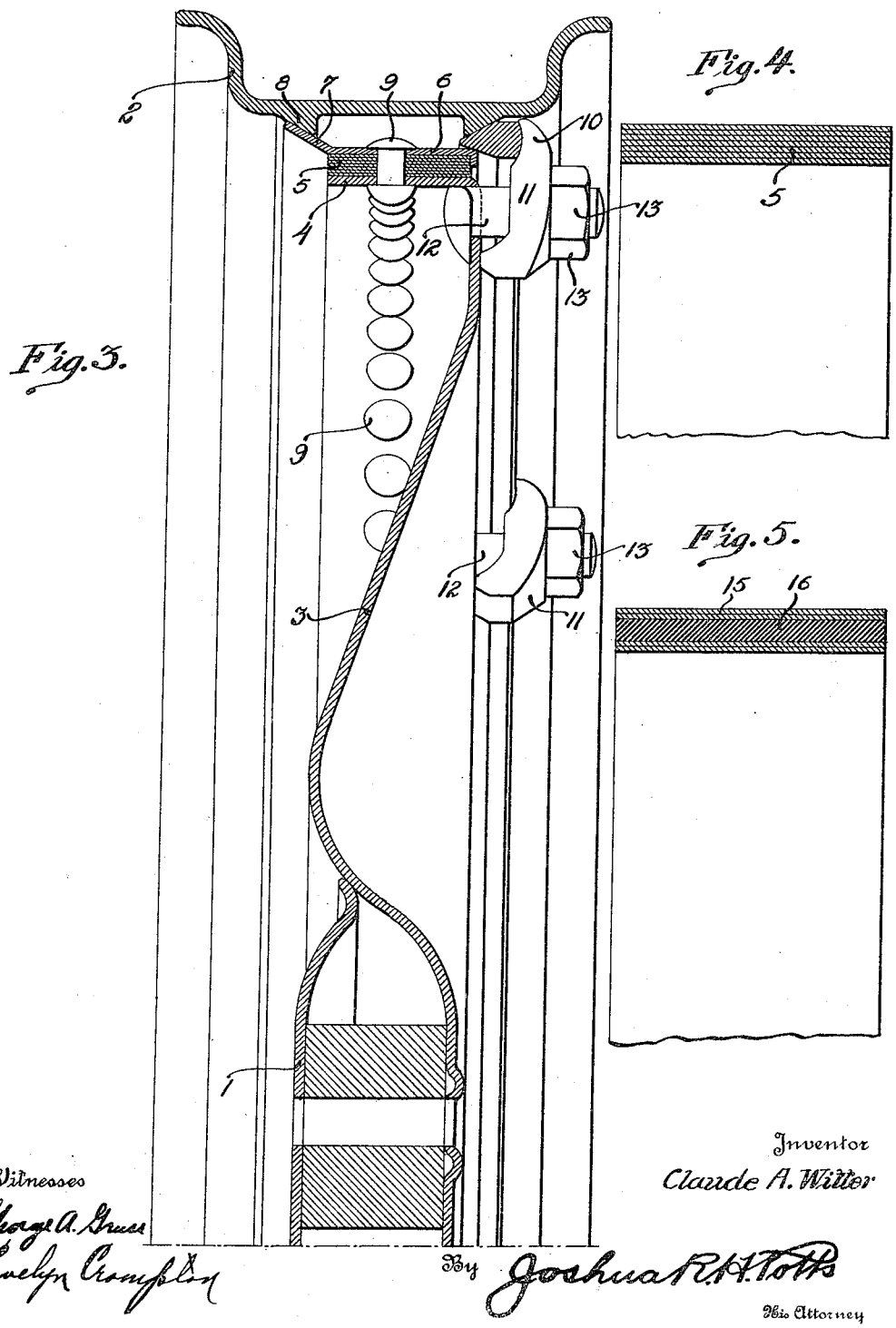
Inventor
Claude A. Witter Jan. 13, 1925. 1,522,662
C. A. WITTER
VEHICLE WHEEL
Filed Feb. 16, 1923 3 Sheets-Sheet 3
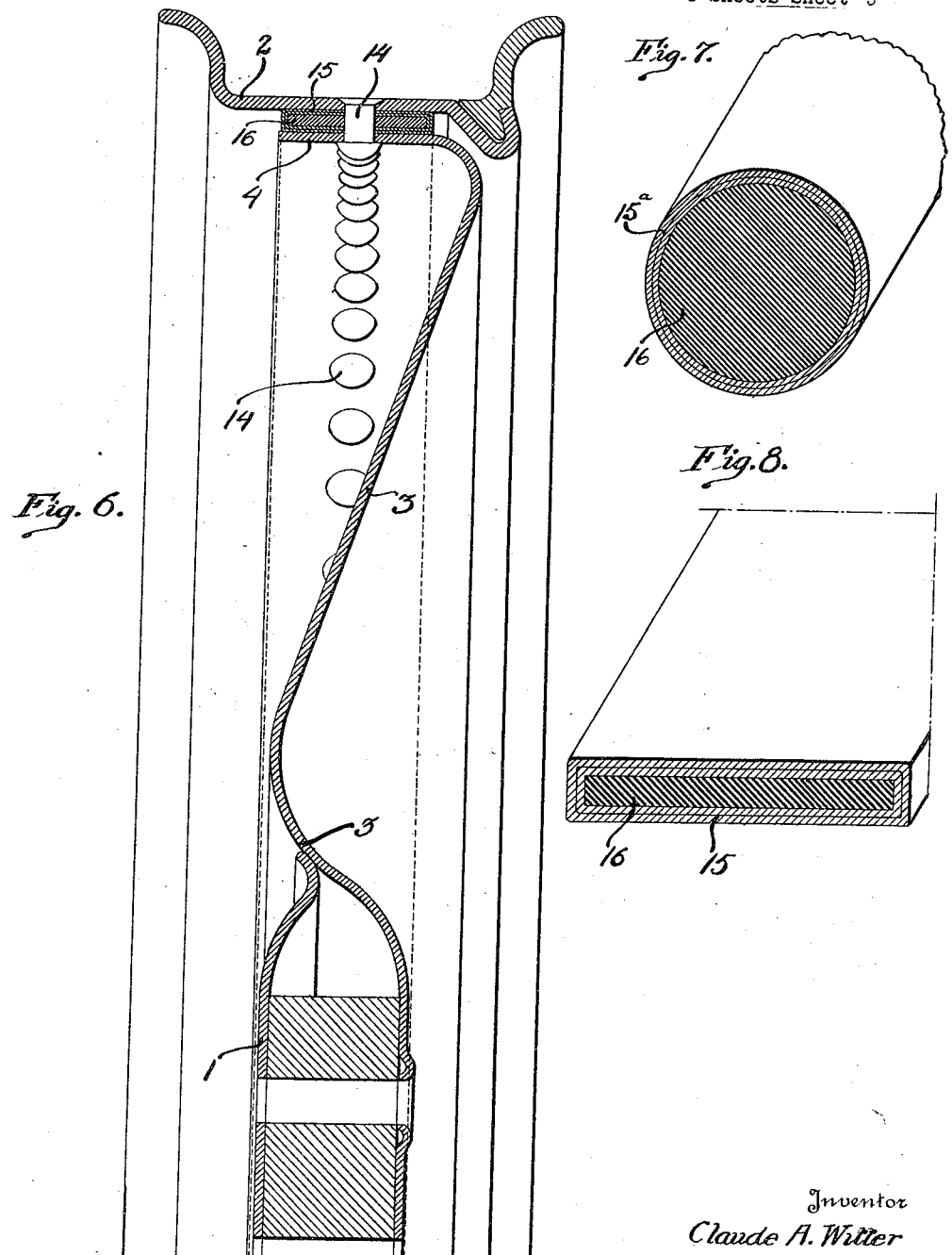
Inventor
Claude A. Witter
By Joshua R.H. Potts
His Attorney Patented Jan. 13, 1925.

1,522,662

UNITED STATES PATENT OFFICE.

CLAUDE A. WITTER, OF PHILADELPHIA, PENNSYLVANIA, ASSIGNOR TO HALL WHEEL CORPORATION, OF PHILADELPHIA, PENNSYLVANIA.

VEHICLE WHEEL.

Application filed February 16, 1923. Serial No. 619,395.

*To all whom it may concern:*

Be it known that I, CLAUDE A. WITTER, a citizen of the United States, residing at Philadelphia, in the county of Philadelphia and State of Pennsylvania, have invented certain new and useful Improvements in Vehicle Wheels, of which the following is a specification.

My invention relates more especially to disk wheels of the general type used on motor vehicles and the object of my invention is to provide a simple and durable wheel of comparatively light construction which will be sufficiently rigid and yet resilient and which will absorb short vibrations and be noiseless when in use.

This object, and other advantageous ends which will be described hereinafter, I attain in the following manner, reference being had to the accompanying drawings in which—

Figure 1:
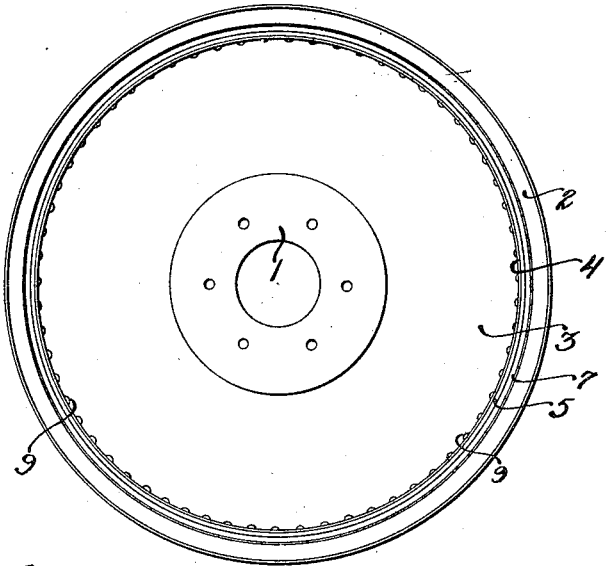
Figure 2:
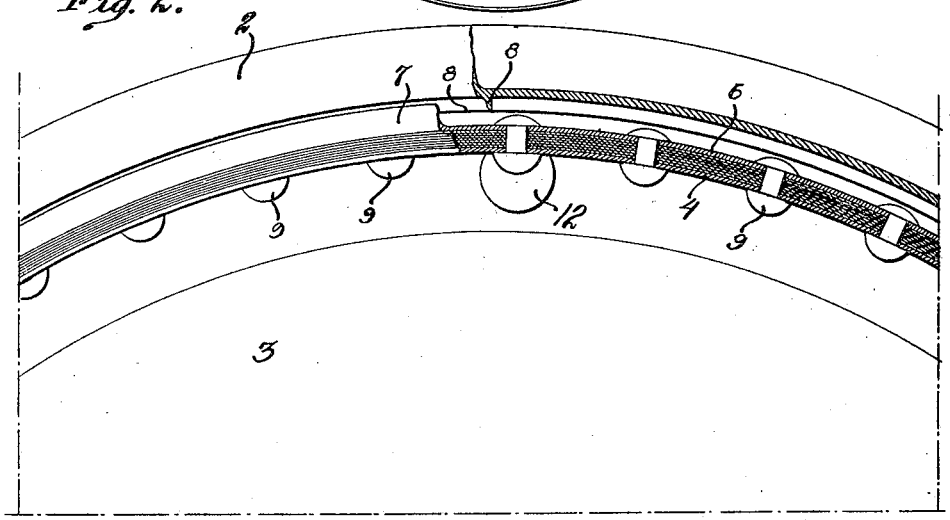

Figure 1 is a side elevation of a wheel made in accordance with my invention,

Figure 2 a view partly in elevation showing a segment of the wheel rim and a resilient member, Figure 3 a fragmentary sectional view showing the wheel from rim to hub, Figures 4 and 5 enlarged fragmentary sectional views showing resilient members of different constructions, Figure 6 a sectional view like that of Figure 3 except that it shows my invention permanently secured to the rim, Figure 7 a fragmentary section showing one method of manufacturing the resilient member, and Figure 8 a fragmentary section showing the final form of the member shown in Figure 7.

Referring to the drawings, the numeral 1 designates the hub of a vehicle wheel, such as an automobile wheel, and 2 the rim, both of which may be of any usual or preferred construction. 3 designates a metallic disk extending from the hub and having a peripheral flange 4, the periphery of the flange being less than the inner periphery of the ring. 5 designates the resilient member ring. 5 designates the resilient member which is in the form of a flat band embracing flange 4. 6 designates a metallic band embracing the resilient band and having an annular extension 7 projecting outwardly at an angle and adapted to engage a beveled annular shoulder 8 on the interior of the rim. The metallic band 6, resilient band 5 and flange 4 are secured to each other by a series of rivets 9. 10 designates an annular member wedge-shaped in cross section and having its wedge face adapted to take between one edge of band 6 and an annular bevel-faced shoulder 8$^a$ on the interior of the rim. The wedge ring may be actuated by clamping members 11 carried by bolts 12 taking through apertures in the disk and provided with nuts 13 by which the wedge ring may be forced inward.

In Figure 3 I have illustrated my invention as applied to a wheel with demountable rim. In Figure 6 I have illustrated it as applied to a wheel demountable at the hub. In the latter case the resilient member is secured directly to the rim by rivets 14, taking through the rim, the resilient member and flange 4 of the disk, metallic band 6 and wedging ring 10, with its clamping members being omitted.

The resilient member preferably consists of non-metallic material in band shape. In Figures 2 to 4 I have illustrated it as consisting of a laminated structure of rubberized fibrous material vulcanized in band shape. The fabric may be cut from full width woven sheets or from a specially woven fabric of the required width and with selvaged edges. In Figures 5, 6 and 8, I have illustrated the resilient member as consisting of a casing 15 of rubberized fabric enclosing a core 16 of rubberized compound vulcanized in band shape. This may be produced by filling a tube 15$^a$ of rubberized fabric, preferably two ply, as shown in Figure 7, and compressing the tube into band shape as shown in Figure 8.

My invention interposes the resilient member in such manner that vibration from the road is not transmitted directly to the disk structure but is absorbed by the resilient member and produces a silent wheel.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claim.

Having thus described my invention, what I claim as new and desire to secure by Letters Patent is:—

A wheel including a hub; a rim; a disk extending from the hub and having a peripheral flange of less circumference than the interior face of the rim; a non-metallic resilient band embracing the flange; a metallic band embracing the resilient band, the resilient band and the metallic band being secured to the disk flange, and means for locking the metallic band in engagement with the rim.

In testimony whereof I have signed my name to this specification in the presence of two subscribing witnesses.

CLAUDE A. WITTER.

Witnesses:
 Jos. B. Katz,
 Chas. E. Potts.